Patented Sept. 7, 1937

2,092,600

UNITED STATES PATENT OFFICE 2,092,600

CEMENT

Wilbur O. Dayton, Chicago, Ill., assignor to Whitday Company, Chicago, Ill., a corporation of Illinois No Drawing. Application December 21, 1936, Serial No. 116,993

1 Claim. (Cl. 134—23.5)

My present invention relates to the provision of a cement and has special reference to the provision of a cement suitable for attaching to metal, lacquer, paint, and like smooth surfaces which provide little or no inequalities to facilitate bonding, such articles as paper, felting and woven fabrics, such as carpets. Such a cement, in order to be satisfactory should, when set, provide requisite bonding strength under such ranges of moisture and temperature changes as will be met in the contemplated use of the cemented product.

The greatly extended employment of metal, sheet as well as other forms, in automobile and automobile body construction, and in the construction of pre-formed houses and trim, have rendered it highly desirable to be able to attach directly to the metal such articles as are above enumerated for the purpose of preventing the ready transmission of heat or sound.

It is readily perceived that if the heat and sound transmitting qualities of metal, as well as its tendency to sweat in moisture ladened atmosphere can be done away with, the use of metal may be largely and advantageously extended.

Such a cement as I desire must, when set, not only dependably adhere to the metal or other smooth surface, but must also provide a plastic body in which the fabrics are dependably mounted and set.

Asphaltum has long been known as a time resisting and tenacious substance, but asphaltum softens too much at warm temperatures and becomes much too brittle at low temperatures to constitute a satisfactory cement.

As will hereafter be seen, I have produced a cement with an asphaltum base and in fluid form which has the property of curing upon the evaporation of the solvent so as to form a substance which resists re-solution and retains strength and flexibility throughout all ranges of temperature which are not sufficiently high to cause the destruction of the articles bonded together by this cement.

In the manufacture of my cement I employ asphaltum, rosin, dehydrated lime, zinc oxide, whiting, rubber and benzol, or other fluid which is at least a partial solvent for both the asphaltum and the rubber. A very important problem is to get these ingredients into a homogeneous fluid mass without causing a separation or deposition of certain of the elements. In order to accomplish this result the substances must be brought together in about the proportions and in the order or succession hereinafter set forth:—

100 parts of asphaltum is mixed or stirred with 75 parts of benzol, or other fluid with which a fluid mixture may be prepared with asphaltum. After the fluid mixture of asphaltum has been prepared 10 parts of powdered rosin are introduced, the rosin being carefully stirred in a small quantity at a time. 15 parts of dehydrated pulverized lime are then added in the same manner, 10 parts of powdered zinc oxide are similarly added, 85 parts of whiting are next added and last 5 parts of ground rubber are added.

If the above proportions and manner and sequence or admixture are not followed separation and deposition of some of the elements from the fluid are very likely to occur. The resultant mass is of a semi-fluid character of a sticky or tacky nature which, when cured and set by the evaporation of the solvent, will be extremely tenacious to the metallic or polished surface and will provide a plastic in which the fibres of the fabric may be permanently embedded.

Having described my invention what I claim is new and desire to secure by Letters Patent is:

A fluid cement comprising substantially 100 parts asphaltum; 75 parts benzol; 10 parts powdered rosin; 15 parts powdered dehydrated lime; 10 parts zinc oxide; 85 parts powdered whiting; 5 parts ground rubber.

WILBUR O. DAYTON.